(12) United States Patent
Iveland

(10) Patent No.: US 11,640,016 B2
(45) Date of Patent: May 2, 2023

(54) LIQUID LENSES WITH MULTI-LAYER WINDOWS

(71) Applicant: CORNING INCORPORATED, Corning, NY (US)

(72) Inventor: Justin Thomas Iveland, Santa Barbara, CA (US)

(73) Assignee: Corning Incorporated, Corning, NY (US)

( * ) Notice: Subject to any disclaimer, the term of this patent is extended or adjusted under 35 U.S.C. 154(b) by 350 days.

(21) Appl. No.: 17/091,871

(22) Filed: Nov. 6, 2020

(65) Prior Publication Data

US 2021/0157037 A1 May 27, 2021

Related U.S. Application Data

(60) Provisional application No. 62/940,498, filed on Nov. 26, 2019.

(51) Int. Cl.
*G02B 3/14* (2006.01)
*G02B 26/00* (2006.01)

(52) U.S. Cl.
CPC .............. *G02B 3/14* (2013.01); *G02B 26/005* (2013.01)

(58) Field of Classification Search
CPC .......... G02B 30/27; G02B 30/28; G02B 3/12; G02B 30/31; G02B 3/14; G02B 26/005; G02B 30/25; G02B 30/30; G02B 1/113; G02B 26/004; G02B 1/10; G02B 3/0012; G02B 30/26; G02B 5/1876; G02B 7/028; G02B 13/0075; G02B 13/14; G02B 27/0068; G02B 27/0172; G02B 27/646; G02B 3/0025; G02B 3/02; G02B 3/08; G02B 30/32; G02B 5/18; G02B 5/1866; G02B 5/32; G02B 6/0035; G02B 6/0048; G02B 6/0068; G02B 7/008; H04N 13/305; H04N 13/356; H04N 13/359; H04N 13/302; H04N 13/31; H04N 13/398; H04N 13/366; H04N 13/128; H04N 13/327;
(Continued)

(56) References Cited

U.S. PATENT DOCUMENTS

| 2011/0222163 | A1* | 9/2011 | Hirabayashi | G02B 3/14 359/666 |
| 2018/0136372 | A1 | 5/2018 | Patscheider et al. | |
| 2019/0033573 | A1 | 1/2019 | Phipps et al. | |

OTHER PUBLICATIONS

DOW Corning, "OE-6450 Optical Encapsulant", Sep. 19, 2013, 3 pages.
(Continued)

*Primary Examiner* — Brandi N Thomas
(74) *Attorney, Agent, or Firm* — Tamika A. Crawl-Bey

(57) ABSTRACT

A liquid lens can include a cavity disposed between a first window and a second window, first and second liquids disposed in the cavity, and a variable interface disposed between the first and second liquids, thereby forming a variable lens. At least one of the first window or the second window can have a multi-layer structure with interior and exterior plies and a deformable spacer disposed between the interior and exterior plies. A refractive index of the interior ply can be substantially the same as a refractive index of the deformable spacer, whereby an index-matched boundary is formed between the interior ply and the deformable spacer. A structural axis of the liquid lens can pass through each of the index-matched boundary and the variable interface.

18 Claims, 12 Drawing Sheets

(58) Field of Classification Search
CPC ............ H04N 13/322; H04N 13/363; H04N 13/373; H04N 5/2253; H04N 5/2254; H04N 5/22541; H04N 5/2257; H04N 5/23212; H04N 5/23222; H04N 5/23238; H04N 13/00; H04N 13/36; G02F 1/29; G02F 1/294; G02F 1/133526; G02F 1/1337; G02F 1/133528; G02F 1/13394; G02F 1/133531; G02F 1/133548; G02F 1/13398; G02F 1/13; G02F 1/13306; G02F 1/1339; G02F 1/134309; G02F 1/13471; G02F 1/292; G02F 2201/38; G02F 1/1335; G02F 1/133504; G02F 1/13392; G02F 1/1343; G02F 1/137; G02F 1/133512; G02F 1/133753; G02F 1/13378; G02F 1/134363; G02F 1/1347; G02F 1/13312; G02F 1/133371; G02F 1/13338; G02F 1/1334; G02F 1/13718; G02F 1/13793; G02F 1/167; G02F 2201/44; G02F 2203/06; G02F 2203/18; G02F 1/1309; G02F 1/133723; G02F 1/13439; G02F 1/291; G02F 2202/16; G02F 2203/28

See application file for complete search history.

(56) References Cited

OTHER PUBLICATIONS

DOW Corning, "OE-6550 Optical Encapsulant", Sep. 4, 2013, 3 pages.
Schott, "D 263 Thin Glass", 2013, 1 page.

\* cited by examiner

LIQUID LENSES WITH MULTI-LAYER WINDOWS

CROSS REFERENCE TO RELATED APPLICATIONS

This application claims the benefit of priority under 35 U.S.C. § 119 of U.S. Provisional Application No. 62/940,498, filed Nov. 26, 2019, the content of which is incorporated herein by reference in its entirety.

BACKGROUND

1. Field

This disclosure relates to liquid lenses, and more particularly, to liquid lenses with multi-layer windows comprising a plurality of plies formed from materials with different compositions and/or properties.

2. Technical Background

Liquid lenses generally include two immiscible liquids disposed within a chamber. Varying the electric field to which the liquids are subjected can vary the wettability of one of the liquids with respect to the chamber wall, thereby varying the shape of the meniscus formed between the two liquids.

SUMMARY

Disclosed herein are liquid lenses with multi-layer windows.

Disclosed herein is a liquid lens comprising a cavity disposed between a first window and a second window, a first liquid disposed in the cavity, a second liquid disposed in the cavity, and a variable interface disposed between the first liquid and the second liquid, thereby forming a variable lens. At least one of the first window or the second window comprises a multi-layer structure comprising an interior ply, an exterior ply, and a deformable spacer disposed between the interior ply and the exterior ply. A refractive index of the interior ply is substantially the same as a refractive index of the deformable spacer, whereby an index-matched boundary is formed between the interior ply and the deformable spacer. A structural axis of the liquid lens passes through each of the index-matched boundary and the variable interface.

Disclosed herein is a liquid lens comprising a cavity disposed between a first window and a second window, a first liquid disposed in the cavity, a second liquid disposed in the cavity, and a variable interface disposed between the first liquid and the second liquid, thereby forming a variable lens. At least one of the first window or the second window comprises a multi-layer structure comprising an interior ply, an exterior ply, and a deformable spacer disposed between the interior ply and the exterior ply. Heating the liquid lens from a first temperature of 20° C. to a second temperature of 85° C. while maintaining the variable interface in a fixed position causes an index-matched boundary between the interior ply and the deformable spacer to deform without substantially changing a focal length of the liquid lens.

Disclosed herein is a liquid lens comprising a cavity disposed between a first window and a second window, a first liquid disposed in the cavity, a second liquid disposed in the cavity, and a variable interface disposed between the first liquid and the second liquid, thereby forming a variable lens. At least one of the first window or the second window comprises a multi-layer structure comprising an interior ply laminated to an exterior ply via a deformable spacer. The deformable spacer comprises an elastomeric material. Heating the liquid lens from a first temperature of 20° C. to a second temperature of 85° C. causes a boundary between the interior ply and the deformable spacer to deform and an unconstrained edge portion of the deformable spacer to bulge outward.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
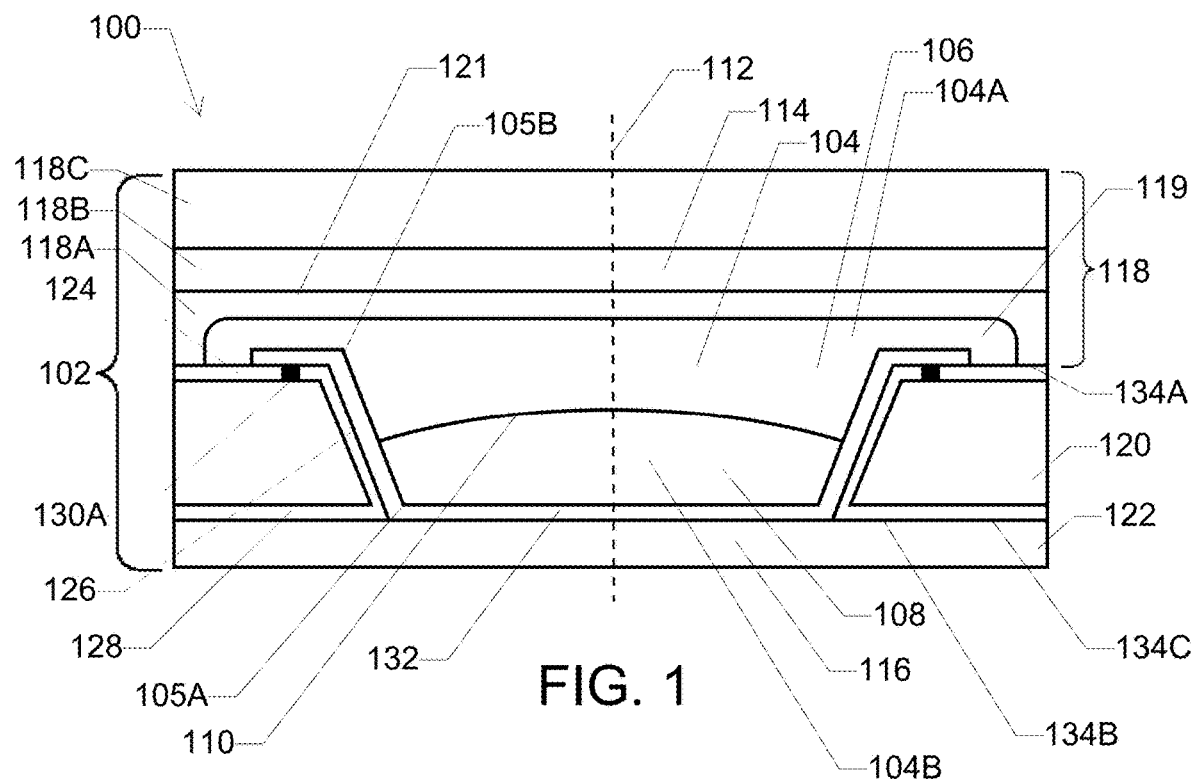
FIG. 1 is a schematic cross-sectional view of some embodiments of a liquid lens.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

As used herein, unless otherwise indicated, the term "formed from" can refer to any of comprising, consisting of, or consisting essentially of. Thus, disclosure of a component formed from a particular material includes disclosures of embodiments of each of the component comprising the particular material, the component consisting essentially of the particular material, and the component consisting of the particular material.

As used herein, unless otherwise indicated, the term "refractive index" refers to the ratio of the velocity of light at a specified wavelength in air, to the velocity of light at the specified wavelength in a subject material. The refractive indices described herein can be measured at a wavelength within a wavelength range of 470 nm to 780 nm. The refractive index of a polymeric or elastomeric material can be measured using the procedure described in ASTM D542—Standard Test Method for Index of Refraction of Transparent Organic Plastics. Additionally, or alternatively, the refractive index of a glass material, a ceramic material, or a glass-ceramic material can be measured using the procedure described in ASTM D1648—Standard Guide for Choosing a Method for Determining the Index of Refraction and Dispersion of Glass.

As used herein, unless otherwise indicated, the term "modulus" refers to the bulk modulus of a material. The modulus can be representative of a material's resistance to volume change when compressed. The modulus of a polymeric or elastomeric material can be measured using the procedure described in ASTM D575—Standard Test Methods for Rubber Properties in Compression.

As used herein, unless otherwise indicated, the term "hardness" refers to a material's resistance to localized plastic deformation induced by either mechanical indentation or abrasion. The hardness of a polymeric or elastomeric material can be measured using the procedure described in ASTM D2240—Standard Test Method for Rubber Property—Durometer Hardness.

As used herein, unless otherwise indicated, the term "radius of curvature" refers to the radius of the circular arc that best approximates a curve at a particular point. The radius of curvature of an interior ply of a multi-layer structure of a liquid lens described herein can be determined by calculating the radius of the circular arc that best approximates the interior surface of the interior ply at the structural axis of the liquid lens. The radius of curvature of an exterior ply of a multi-layer structure of a liquid lens described herein can be determined by calculating the radius of the circular arc that best approximates the exterior surface of the exterior ply at the structural axis of the liquid lens. Radius of curvature can be measured, for example, by contact profilometry, atomic force microscope, laser scanning profilometry, white light interferometer, or another suitable shape-determining technique. For example, the shape of the surface of interest can be determined (e.g., using a suitable shape-determining technique), and the determined shape can be fit to a circle to determine the radius of curvature.

As used herein, unless otherwise indicated, the terms "stiffness" and "rigidity" refer to the relationship between stress and strain in a material. The stiffness or rigidity of a glass material, a ceramic material, or a glass-ceramic material can be represented by Young's modulus, which can be measured using the procedure described in ASTM C623—Standard Test Method for Young's Modulus, Shear Modulus, and Poisson's Ratio for Glass and Glass-Ceramics by Resonance.

In various embodiments, a liquid lens comprises a cavity disposed between a first window and a second window, a first liquid disposed in the cavity, a second liquid disposed in the cavity, and a variable interface disposed between the first liquid and the second liquid, thereby forming a variable lens. At least one of the first window or the second window can comprise a multi-layer structure. For example, the multi-layer structure comprises an interior ply, an exterior ply, and a deformable spacer disposed between the interior ply and the exterior ply. The deformable spacer can be an interlayer that bonds the interior ply and the exterior ply to each other. In some embodiments, a refractive index of the interior ply is substantially the same as a refractive index of the deformable spacer, whereby an index-matched boundary is formed between the interior ply and the deformable spacer. A structural axis of the liquid lens can pass through each of the index-matched boundary and the variable interface.

The window comprising the multi-layer structure described herein can enable the liquid lens to accommodate expansion and/or contraction of the first liquid and/or the second liquid disposed in the cavity without substantially changing the focal length or optical power of the liquid lens. For example, upon expansion of the liquids (e.g., as a result of heating the liquid lens) the interior ply of the multi-layer structure can deflect or bow outward, thereby changing (e.g., decreasing) the radius of curvature of the interior ply. Such change of curvature of the interior ply can cause the index-matched boundary between the interior ply and the deformable spacer to deform or change shape. For example, such change of curvature of the interior ply can apply pressure to a central region of the deformable spacer, thereby causing the deformable spacer to expand or bulge outward at the edges to accommodate the change of curvature of the interior ply. Because the change in curvature of the interior ply can be accommodated by the deformable spacer, the exterior ply can be substantially free of any corresponding change in curvature. For example, the exterior ply can remain substantially planar. Maintaining the shape of the exterior ply can avoid any substantial change in focal length or optical power of the liquid lens that would be caused by a change in curvature of the exterior ply (e.g., as a result of a change in shape of a boundary between the exterior ply and a surrounding medium, such as air). Additionally, or alternatively, because the boundary between the interior ply and the deformable spacer is an index-matched boundary, the change in shape of the index-matched boundary does not cause any substantial change in focal length of the liquid lens. Thus, the multi-layer structure can enable the liquid lens to accommodate expansion and/or contraction of the liquids contained therein without a corresponding change in focal length or optical power, thereby enabling improved optical performance over a relatively large operating temperature range.

FIG. 1 is a schematic cross-sectional view of some embodiments of a liquid lens 100. In some embodiments, liquid lens 100 comprises a lens body 102 and a cavity 104 formed or disposed in the lens body. A first liquid 106 and a second liquid 108 are disposed within cavity 104. In some embodiments, first liquid 106 is a polar liquid or a conducting liquid (e.g., an aqueous salt solution). Additionally, or alternatively, second liquid 108 is a non-polar liquid or an insulating liquid (e.g., an oil). In some embodiments, first liquid 106 and second liquid 108 have different refractive indices such that an interface 110 between the first liquid and the second liquid forms a lens. In some embodiments, first liquid 106 and second liquid 108 have substantially the same density, which can help to avoid changes in the shape of interface 110 as a result of changing the physical orientation of liquid lens 100 (e.g., as a result of gravitational forces).

In some embodiments, first liquid 106 and second liquid 108 are in direct contact with each other at interface 110. For example, first liquid 106 and second liquid 108 are substantially immiscible with each other such that the contact surface between the first liquid and the second liquid defines interface 110. In some embodiments, first liquid 106 and second liquid 108 are separated from each other at interface 110. For example, first liquid 106 and second liquid 108 are separated from each other by a membrane (e.g., a polymeric membrane) that defines interface 110.

In some embodiments, cavity 104 comprises a first portion, or headspace, 104A and a second portion, or base portion, 104B. For example, second portion 104B of cavity 104 is defined by a bore in an intermediate layer of liquid lens 100 as described herein. Additionally, or alternatively, first portion 104A of cavity 104 is defined by a recess in a first outer layer of liquid lens 100 and/or disposed outside of the bore in the intermediate layer as described herein. In some embodiments, at least a portion of first liquid 106 is disposed in first portion 104A of cavity 104. Additionally, or alternatively, second liquid 108 is disposed within second portion 104B of cavity 104. For example, substantially all or a portion of second liquid 108 is disposed within second portion 104B of cavity 104. In some embodiments, the perimeter of interface 110 (e.g., the edge of the interface in contact with the sidewall of the cavity) is disposed within second portion 104B of cavity 104.

Interface 110 can be adjusted via electrowetting. For example, a voltage can be applied between first liquid 106 (e.g., an electrode in electrical communication with the first liquid as described herein) and a surface of cavity 104 (e.g., an electrode positioned near the surface of the cavity and insulated from the first liquid as described herein) to increase or decrease the wettability of the surface of the cavity with respect to the first liquid and change the shape of interface 110 as described herein. In some embodiments, a refractive index of first liquid 106 is different than a refractive index of second liquid 108 such that light is refracted at interface 110 as described herein. For example, first liquid 106 has a lower refractive index or a higher refractive index than second liquid 108. Thus, interface 110 can function as a variable lens also as described herein.

In some embodiments, lens body 102 of liquid lens 100 comprises a first window 114 and a second window 116. In some of such embodiments, at least a portion of cavity 104 is disposed between first window 114 and second window 116. In some embodiments, lens body 102 comprises a plurality of layers that cooperatively form the lens body. For example, in the embodiments shown in FIG. 1, lens body 102 comprises a first outer layer 118 (e.g., a top plate), an intermediate layer 120 (e.g., a cone plate), and a second outer layer 122 (e.g., a bottom plate). One or more layers of lens body 102 can comprise a multi-layer structure as described herein. In some embodiments, intermediate layer 120 comprises a bore formed therethrough. First outer layer 118 can be bonded to one side (e.g., the object side or the top side) of intermediate layer 120. For example, first outer layer 118 is bonded to intermediate layer 120 at a bond 134A. Bond 134A can be an adhesive bond, a laser bond (e.g., a room temperature laser bond or a laser weld), or another suitable bond capable of maintaining first liquid 106 and second liquid 108 within cavity 104. Additionally, or alternatively, second outer layer 122 can be bonded to the other side (e.g., the image side or the bottom side) of intermediate layer 120 (e.g., opposite first outer layer 118). For example, second outer layer 122 is bonded to intermediate layer 120 at a bond 134B and/or a bond 134C, each of which can be configured as described herein with respect to bond 134A. In some embodiments, intermediate layer 120 is disposed between first outer layer 118 and second outer layer 122, the bore in the intermediate layer is covered on opposing sides by the first outer layer and the second outer layer, and at least a portion of cavity 104 is defined within the bore. Thus, a portion of first outer layer 118 covering cavity 104 serves as first window 114, and a portion of second outer layer 122 covering the cavity serves as second window 116.

In some embodiments, cavity 104 comprises first portion 104A and second portion 104B. For example, in the embodiments shown in FIG. 1, second portion 104B of cavity 104 is defined by the bore in intermediate layer 120, and first portion 104A of the cavity is disposed between the second portion of the cavity and first outer layer 118. In some embodiments, first outer layer 118 comprises a recess 119 as shown in FIG. 1, and first portion 104A of cavity 104 is disposed within the recess in the first outer layer. In some embodiments, first portion 104A of cavity 104 is disposed outside of the bore in intermediate layer 120. In some embodiments, recess 119 comprises a notch (e.g., a circular notch) formed in a central region of first outer layer 118. In some embodiments, a thinned portion of first outer layer 118 (or a ply thereof as described herein) can serve as a flexure. For example, a relatively thin portion of first outer layer 118 (or a ply thereof) corresponding to recess 119 can move axially (e.g., up and down along structural axis 112). Such movement can enable first outer layer 118 to compensate for changes in the volume of first fluid 106 and/or second fluid 108 (e.g., resulting from temperature changes and corresponding expansion and/or contraction of the fluids).

In some embodiments, cavity 104, or a portion thereof (e.g., second portion 104B of the cavity), is tapered as shown in FIG. 1 such that a cross-sectional area of the cavity decreases along a structural axis 112 of liquid lens 100 in a direction from first window 114 toward second window 116 (e.g., from the object side to the image side). For example, second portion 104B of cavity 104 comprises a conical or frustoconical shape with a narrow end 105A and a wide end 105B. The terms "narrow" and "wide" are relative terms, meaning the narrow end is narrower, or has a smaller width or diameter, than the wide end. Such a tapered cavity can help to maintain alignment of interface 110 between first liquid 106 and second liquid 108 along structural axis 112. In other embodiments, the cavity is tapered such that the cross-sectional area of the cavity increases along the structural axis in the direction from first window 114 toward second window 116 or non-tapered such that the cross-sectional area of the cavity remains substantially constant along the structural axis. In some embodiments, cavity 104 is rotationally symmetrical about structural axis 112.

In some embodiments, image light enters liquid lens 100 through first window 114, is refracted at interface 110 between first liquid 106 and second liquid 108, and exits the liquid lens through second window 116. In some embodiments, first outer layer 118 and/or second outer layer 122 comprise a sufficient transparency to enable passage of the image light. For example, first outer layer 118 and/or second outer layer 122 comprise a polymeric, glass, ceramic, glass-ceramic material, or combinations thereof. In some embodiments, outer surfaces of first outer layer 118 and/or second outer layer 122 are substantially planar. Thus, even though liquid lens 100 can function as a lens (e.g., by refracting image light passing through interface 110), outer surfaces of the liquid lens can be flat as opposed to being curved like the outer surfaces of a fixed lens. Such planar outer surfaces can make integrating liquid lens 100 into an optical assembly (e.g., a lens stack comprising one or more fixed lenses disposed in a housing or lens barrel) less difficult. In other embodiments, outer surfaces of the first outer layer and/or the second outer layer are curved (e.g., concave or convex). Thus, the liquid lens can comprise an integrated fixed lens. In some embodiments, intermediate layer 120 comprises a metallic, polymeric, glass, ceramic, glass-ceramic material, or combinations thereof. Because image light can pass through the bore in intermediate layer 120, the intermediate layer may or may not be transparent.

Although lens body 102 of liquid lens 100 is described as comprising first outer layer 118, intermediate layer 120, and second outer layer 122, other embodiments are included in this disclosure. For example, in some other embodiments, one or more of the layers is omitted. For example, the bore in the intermediate layer can be configured as a blind hole that does not extend entirely through the intermediate layer, and the second outer layer can be omitted. Although first portion 104A of cavity 104 is described herein as being disposed within recess 119 in first outer layer 118, other embodiments are included in this disclosure. For example, in some other embodiments, the recess is omitted, and the first portion of the cavity is disposed within the bore in the intermediate layer. Thus, the first portion of the cavity is an upper portion of the bore, and the second portion of the cavity is a lower portion of the bore. In some other embodiments, the first portion of the cavity is disposed partially within the bore in the intermediate layer and partially outside the bore.

In some embodiments, liquid lens 100 comprises a common electrode 124 in electrical communication with first liquid 106. Additionally, or alternatively, liquid lens 100 comprises a driving electrode 126 disposed on a sidewall of cavity 104 and insulated from first liquid 106 and second liquid 108. Different voltages can be supplied to common electrode 124 and driving electrode 126 (e.g., different potentials can be supplied between the common electrode and the driving electrode) to change the shape of interface 110 as described herein.

In some embodiments, liquid lens 100 comprises a conductive layer 128 at least a portion of which is disposed within cavity 104. For example, conductive layer 128 comprises a conductive coating applied to intermediate layer 120 prior to bonding first outer layer 118 and/or second outer layer 122 to the intermediate layer. Conductive layer 128 can comprise a metallic material, a conductive polymer material, another suitable conductive material, or a combination thereof. Additionally, or alternatively, conductive layer 128 can comprise a single layer or a plurality of layers, some or all of which can be conductive. In some embodiments, conductive layer 128 defines common electrode 124 and/or driving electrode 126. Conductive layer 128 can be patterned during or after application to intermediate layer 120. For example, conductive layer 128 can be applied to substantially the entire outer surface of intermediate layer 120 prior to bonding first outer layer 118 and/or second outer layer 122 to the intermediate layer. Following application of conductive layer 128 to intermediate layer 118, the conductive layer can be segmented into various conductive elements (e.g., common electrode 124, driving electrode 126, and/or other electrical devices). In some embodiments, liquid lens 100 comprises a scribe 130A in conductive layer 128 to isolate (e.g., electrically isolate) common electrode 124 and driving electrode 126 from each other. In some embodiments, scribe 130A comprises a gap in conductive layer 128. For example, scribe 130A is a gap with a width of about 5 µm, about 10 µm, about 15 µm, about 20 µm, about 25 µm, about 30 µm, about 35 µm, about 40 µm, about 45 µm, about 50 µm, or any ranges defined by the listed values.

In some embodiments, liquid lens 100 comprises an insulating layer 132 disposed within cavity 104. For example, insulating layer 132 comprises an insulating coating applied to intermediate layer 120 and second outer layer 122 prior to bonding first outer layer 118 to the intermediate layer. In some embodiments, insulating layer 132 comprises an insulating coating applied to conductive layer 128 and second window 116 after bonding second outer layer 122 to intermediate layer 120 and prior to bonding first outer layer 118 to the intermediate layer. Thus, insulating layer 132 covers at least a portion of conductive layer 128 within cavity 104 (e.g., driving electrode 126) and second window 116. In some embodiments, insulating layer 132 can be sufficiently transparent to enable passage of image light through second window 116 as described herein. Insulating layer 132 can comprise polytetrafluoroethylene (PTFE), parylene, another suitable polymeric or non-polymeric insulating material, or a combination thereof. Additionally, or alternatively, insulating layer 132 comprises a hydrophobic material. Additionally, or alternatively, insulating layer 132 can comprise a single layer or a plurality of layers, some or all of which can be insulating and/or hydrophobic.

In some embodiments, insulating layer 132 covers at least a portion of driving electrode 126 (e.g., the portion of the driving electrode disposed within cavity 104) to insulate first liquid 106 and second liquid 108 from the driving electrode. Additionally, or alternatively, at least a portion of common electrode 124 disposed within cavity 104 is uncovered by insulating layer 132. Thus, common electrode 124 can be in electrical communication with first liquid 106 as described herein. In some embodiments, insulating layer 132 comprises a hydrophobic surface layer of at least a portion of cavity 104 (e.g., second portion 104B of the cavity). Such a hydrophobic surface layer can help to maintain second liquid 108 within second portion 104B of cavity 104 (e.g., by attraction between the non-polar second liquid and the hydrophobic material) and/or enable the perimeter of interface 110 to move along the hydrophobic surface layer (e.g., by electrowetting) to change the shape of the interface as described herein.

Figure 2:
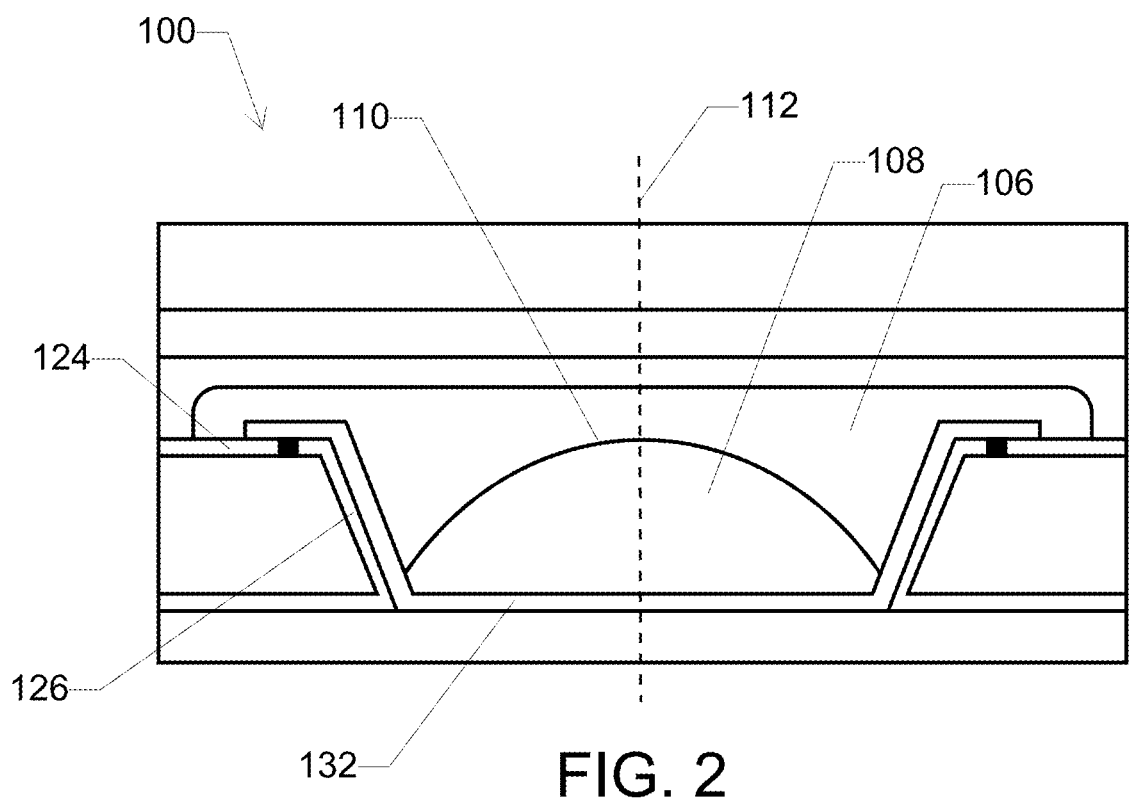
FIG. 2 is a schematic cross-sectional view of some embodiments of the liquid lens shown in FIG. 1 with a varied focal length compared to FIG. 1.

In some embodiments, adjusting interface 110 changes the shape of the interface, which changes the focal length or focus of liquid lens 100. FIG. 2 is a cross-sectional schematic view of liquid lens 100 with an adjusted focal length or focus compared to FIG. 1. For example, the voltage or potential between driving electrode 126 and common electrode 124 can be increased to increase the wettability of insulating layer 132 with respect to first liquid 106, thereby driving the first liquid farther down the sidewall and causing interface 110 to change shape. In some embodiments, the refractive index of first liquid 106 is less than the refractive index of second liquid 108 such that increasing the convex curvature of interface 110 as shown in FIG. 2 increases the optical power of liquid lens 100. In some embodiments, decreasing the voltage can move interface 110 in the opposite direction to decrease the optical power of liquid lens 100. For example, interface 110 can be moved in the opposite direction until the interface becomes flat (e.g., no optical power) or even concave (e.g., negative optical power). In some embodiments, the change in shape of interface 110 can be symmetrical about structural axis 112, thereby changing the focal length of liquid lens 100. Such a change of focal length can enable liquid lens 100 to perform an autofocus function.

Figure 3:
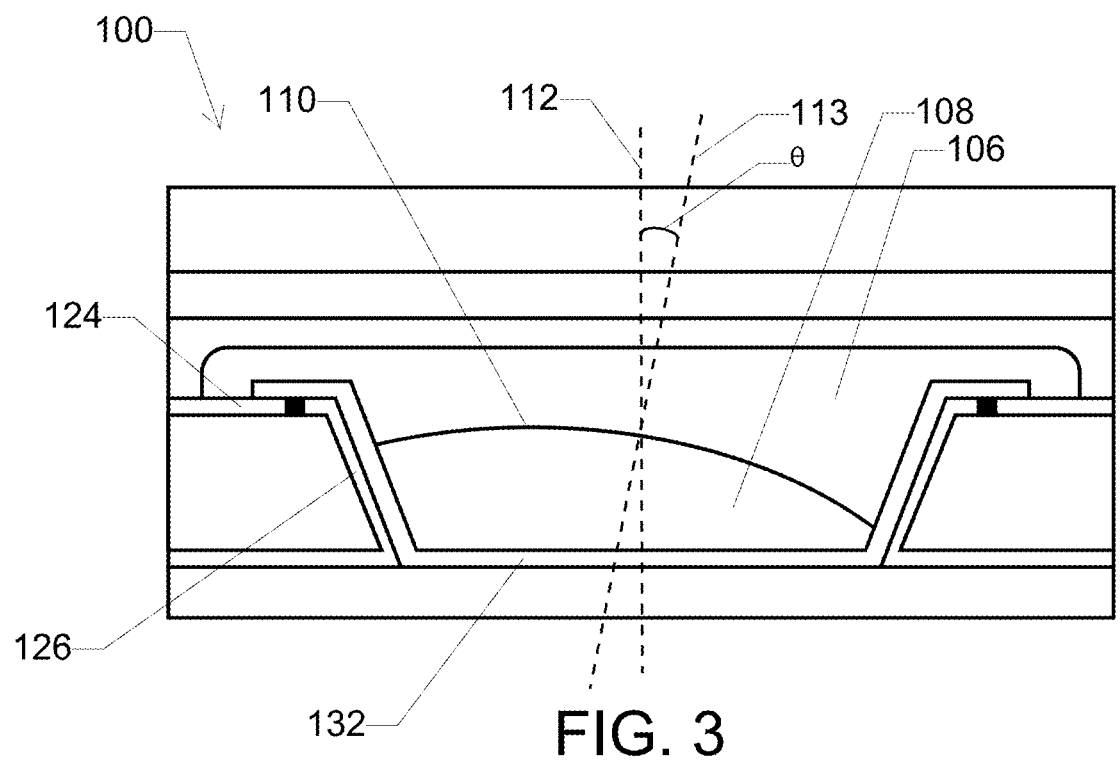
FIG. 3 is a schematic cross-sectional view of some embodiments of the liquid lens shown in FIG. 1 with a varied tilt compared to FIG. 1.

In some embodiments, adjusting interface 110 tilts the interface relative to structural axis 112 of liquid lens 100. FIG. 3 is a cross-sectional schematic view of liquid lens 100 with an adjusted tilt compared to FIG. 1. For example, the voltage between a first portion of driving electrode 126 (e.g., a third driving electrode segment 126C as described herein, positioned on a right side of cavity 104) and common electrode 124 can be increased to increase the wettability of insulating layer 132 with respect to first liquid 106, thereby driving the first liquid farther down the sidewall on one side of the cavity, while the voltage between a second portion of the driving electrode opposite the first portion of the driving electrode (e.g., a first driving electrode segment 126A as described herein, positioned on a left side of the cavity) and the common electrode can be decreased to decrease the wettability of the insulating layer with respect to the first liquid, thereby driving the first liquid farther up the sidewall on an opposite side of the cavity. Following such a change in shape of interface 110, a physical tilt angle θ can be formed between an optical axis 113 of the interface and structural axis 112. For example, optical axis 113 of the tilted interface 110 can be angled relative to structural axis 112 at physical tilt angle θ. An optical tilt angle of liquid lens 100 can be determined based on physical tilt angle θ and the difference in refractive index between first liquid 106 and second liquid 108. The optical tilt angle can be representative of a degree to which interface 110 can refract light passing through liquid lens 100. Such tilting can enable liquid lens 100 to perform an optical image stabilization (OIS) function. Adjusting interface 110 can be achieved without physical movement of liquid lens 100 relative to an image sensor, a fixed lens or lens stack, a housing, or other components of a camera module in which the liquid lens can be incorporated.

Figure 4:
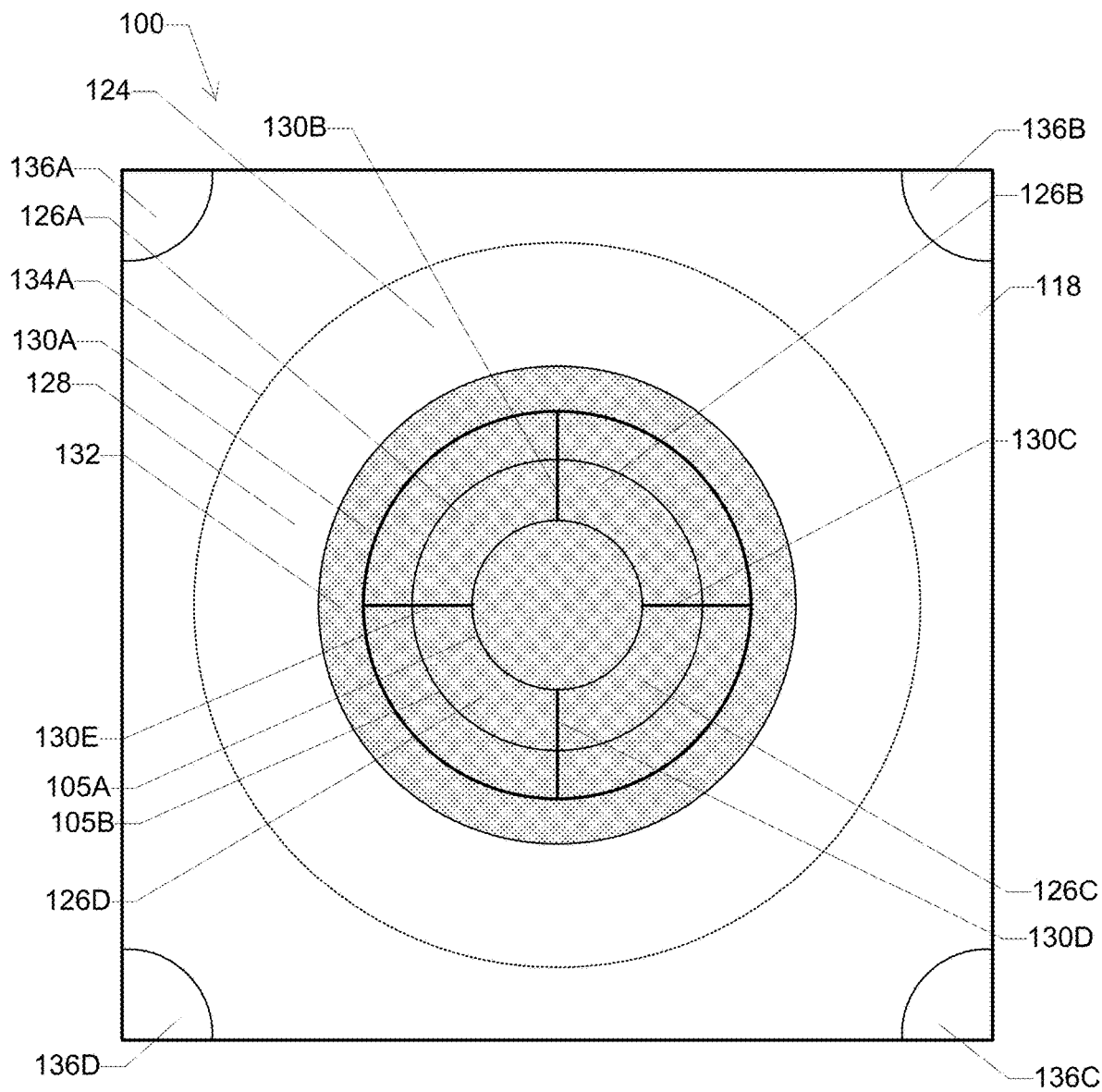
FIG. 4 is a schematic front view of some embodiments of the liquid lens shown in FIG. 1 looking through a first outer layer of the liquid lens.
Figure 5:
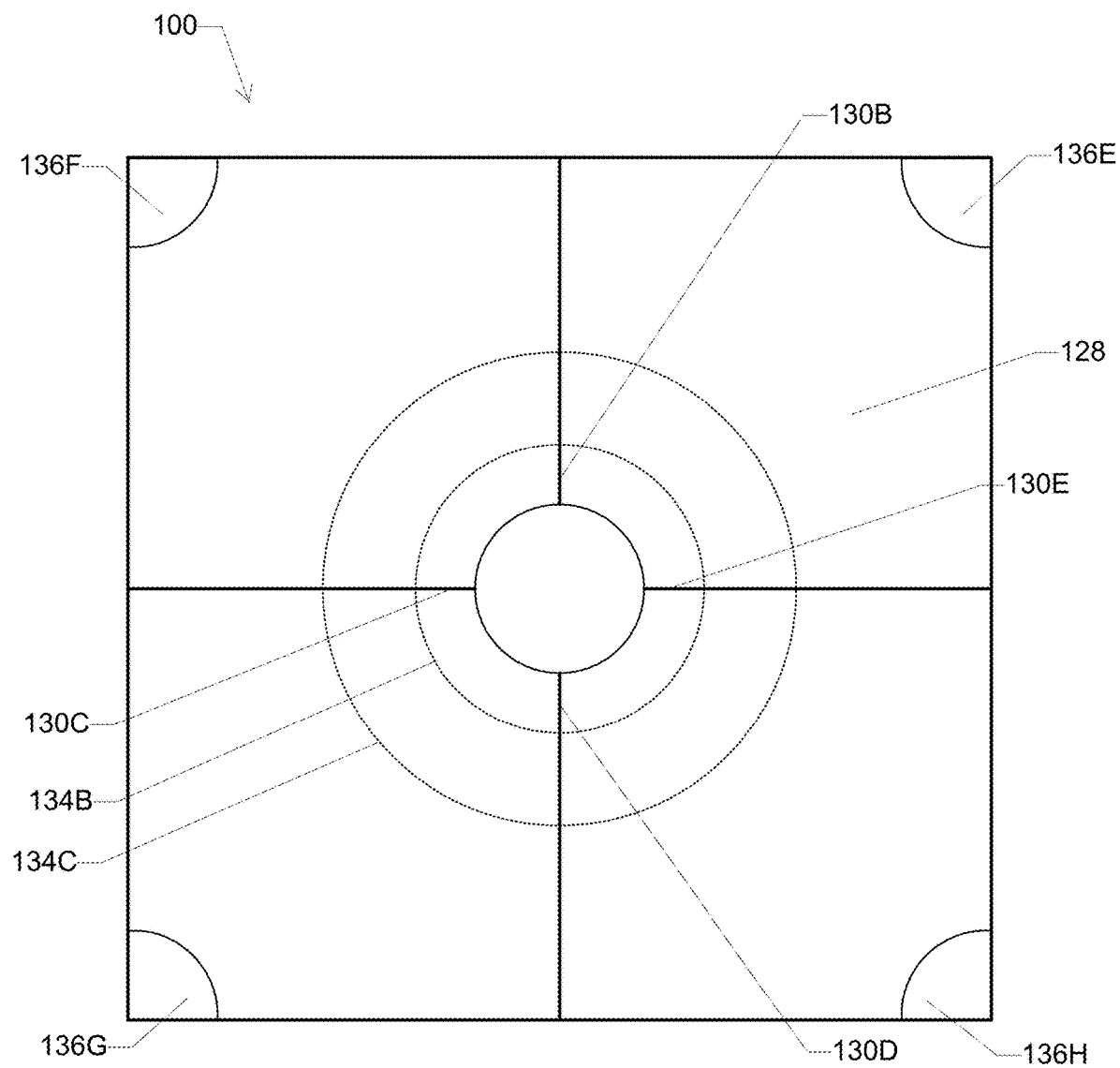
FIG. 5 is a schematic rear view of some embodiments of the liquid lens shown in FIG. 1 looking through a second outer layer of the liquid lens.

FIG. 4 is a schematic front view of liquid lens 100 looking through first outer layer 118, and FIG. 5 is a schematic rear view of the liquid lens looking through second outer layer 122. For clarity in FIGS. 4 and 5, and with some exceptions, bonds generally are shown in dashed lines, scribes generally are shown in heavier lines, and other features generally are shown in lighter lines.

In some embodiments, common electrode 124 is defined between scribe 130A and bond 134A, and a portion of the common electrode is uncovered by insulating layer 132 such that the common electrode can be in electrical communication with first liquid 106 as described herein. In some embodiments, bond 134A is configured such that electrical continuity is maintained between the portion of conductive layer 128 inside the bond (e.g., inside cavity 104) and the portion of the conductive layer outside the bond (e.g., outside the cavity). In some embodiments, liquid lens 100 comprises one or more cutouts 136 in first outer layer 118. For example, in the embodiments shown in FIG. 4, liquid lens 100 comprises a first cutout 136A, a second cutout 136B, a third cutout 136C, and a fourth cutout 136D. In some embodiments, cutouts 136 comprise portions of liquid lens 100 at which first outer layer 118 is removed to expose conductive layer 128. Thus, cutouts 136 can enable electrical connection to common electrode 124, and the regions of conductive layer 128 exposed at the cutouts can serve as contacts to enable electrical connection of liquid lens 100 to a controller, a driver, or another component of a lens or camera system.

Although cutouts 136 are described herein as being positioned at corners of liquid lens 100, other embodiments are included in this disclosure. For example, in some embodiments, one or more of the cutouts are disposed inboard of the outer perimeter of the liquid lens and/or along one or more edges of the liquid lens.

In some embodiments, driving electrode 126 comprises a plurality of driving electrode segments. For example, in the embodiments shown in FIGS. 4 and 5, driving electrode 126 comprises a first driving electrode segment 126A, a second driving electrode segment 126B, a third driving electrode segment 126C, and a fourth driving electrode segment 126D. In some embodiments, the driving electrode segments are distributed substantially uniformly about the sidewall of cavity 104. For example, each driving electrode segment occupies about one quarter, or one quadrant, of the sidewall of second portion 104B of cavity 104. In some embodiments, adjacent driving electrode segments are isolated from each other by a scribe. For example, first driving electrode segment 126A and second driving electrode segment 126B are isolated from each other by a scribe 130B. Additionally, or alternatively, second driving electrode segment 126B and third driving electrode segment 126C are isolated from each other by a scribe 130C. Additionally, or alternatively, third driving electrode segment 126C and fourth driving electrode segment 126D are isolated from each other by a scribe 130D. Additionally, or alternatively, fourth driving electrode segment 126D and first driving electrode segment 126A are isolated from each other by a scribe 130E. The various scribes 130 can be configured as described herein in reference to scribe 130A. In some embodiments, the scribes between the various electrode segments extend beyond cavity 104 and onto the back side of liquid lens 100 as shown in FIG. 5. Such a configuration can ensure electrical isolation of the adjacent driving electrode segments from each other. Additionally, or alternatively, such a configuration can enable each driving electrode segment to have a corresponding contact for electrical connection as described herein.

Although driving electrode 126 is described herein as being divided into four driving electrode segments, other embodiments are included in this disclosure. In some other embodiments, the driving electrode comprises a single driving electrode (e.g., substantially circumscribing the sidewall of the cavity). For example, the liquid lens comprising the such a single driving electrode can be capable of varying focal length, but incapable of tilting the interface (e.g., an autofocus only liquid lens). In some other embodiments, the driving electrode is divided into two, three, five, six, seven, eight, or more driving electrode segments (e.g., distributed substantially uniformly about the sidewall of the cavity).

In some embodiments, bond 134B and/or bond 134C are configured such that electrical continuity is maintained between the portion of conductive layer 128 inside the respective bond and the portion of the conductive layer outside the respective bond. In some embodiments, liquid lens 100 comprises one or more cutouts 136 in second outer layer 122. For example, in the embodiments shown in FIG. 5, liquid lens 100 comprises a fifth cutout 136E, a sixth cutout 136F, a seventh cutout 136G, and an eighth cutout 136H. In some embodiments, cutouts 136 comprise portions of liquid lens 100 at which second outer layer 122 is removed to expose conductive layer 128. Thus, cutouts 136 can enable electrical connection to driving electrode 126, and the regions of conductive layer 128 exposed at cutouts 136 can serve as contacts to enable electrical connection of liquid lens 100 to a controller, a driver, or another component of a lens or camera system.

Different driving voltages can be supplied to different driving electrode segments to tilt the interface of the liquid lens (e.g., for OIS functionality). Additionally, or alternatively, a driving voltage can be supplied to a single driving electrode or the same driving voltage can be supplied to each driving electrode segment to maintain the interface of the liquid lens in a substantially spherical orientation about the structural axis (e.g., for autofocus functionality).

In some embodiments, one or more layers of liquid lens 100 comprise a multi-layer structure. For example, in the embodiments shown in FIG. 1, first outer layer 118 comprises the multi-layer structure. The multi-layer structure can comprise a plurality of plies. For example, the multi-layer structure comprises an interior ply 118A, an exterior ply 118C, and a deformable spacer 118B disposed between the interior ply and the exterior ply. In some embodiments, the multi-layer structure comprises a laminated stack in which interior ply 118A is bonded to exterior ply 118C via deformable spacer 118B. For example, each of interior ply 118A and exterior ply 118C can be formed from a glass material, a glass-ceramic material, or a combination thereof, and deformable spacer 118B can comprise an interlayer disposed between the interior ply and the exterior ply to form the laminated stack.

In some embodiments, first outer layer 118 comprises first window 114 (e.g., the central region of the first outer layer overlying cavity 104 as described herein) and a peripheral region at least partially circumscribing the first window. The peripheral region of first outer layer 118 can be bonded to intermediate layer 120. For example, interior ply 118A of first outer layer 118 is bonded to intermediate layer 120 at bond 134A as shown in FIG. 1. In some embodiments, first outer layer 118 comprises recess 119 as described herein. For example, interior ply 118A of first outer layer 118 comprises recess 119 comprising a notch formed in an interior surface of the interior ply as shown in FIG. 1. In some embodiments, the notch is formed in the central region of interior ply 118A such that the peripheral region of the interior ply forms a flange that can be bonded to intermediate layer 120. In some embodiments, the recess comprises a notch formed on one or both of the interior surface and the exterior surface of the interior ply. Recess 119 can enable the interior ply to flex as described herein. For example, first window 114 comprises a central region of interior ply 118A, and the interior ply comprises a peripheral region substantially circumscribing the central region. The central region of interior ply 118A can have a reduced thickness and/or a reduced stiffness compared to the peripheral region of the interior ply, which can enable the central region of the interior ply to flex as described herein. Additionally, or alternatively, the peripheral region of interior ply 118A can be bonded to intermediate layer 120. In some embodiments, exterior ply 118C is substantially planar as shown in FIG. 1. For example, exterior ply 118C has a substantially uniform thickness. Additionally, or alternatively, exterior ply 118C can be thicker and/or stiffer or more rigid than interior ply 118A. Such thickness and/or stiffness can prevent exterior ply 118C from flexing as described herein.

In some embodiments, an interface between interior ply 118A and deformable spacer 118B comprises an index-matched boundary 121. For example, a refractive index of interior ply 118A (e.g., the material from which the interior ply is formed) is substantially the same as a refractive index of deformable spacer 118B (e.g., the material from which the deformable spacer is formed), whereby index-matched boundary 121 is formed between the interior ply and the deformable spacer. In some embodiments, the refractive index of interior ply 118A and the refractive index of deformable spacer 118B (e.g., each measured at the same wavelength within the wavelength range of 470 nm to 780 nm and/or measured over all or substantially all of the wavelength range of 470 nm to 780 nm) differ by 0.5, 0.4, 0.3, 0.2, 0.1, 0.09, 0.08, 0.07, 0.06, 0.05, 0.04, 0.03, 0.02, 0.01, 0.005, 0.004, 0.003, 0.002, 0.001, 0, or any ranges defined by the listed values. Matching the refractive indices of interior ply 118A and deformable spacer 118B can help to reduce reflection and/or refraction of light incident on index-matched boundary 121 as described herein. Additionally, or alternatively, Index-matched boundary 121 can help to avoid changes in optical power of liquid lens 100 when interior ply 118A deforms as described herein.

Figure 6:
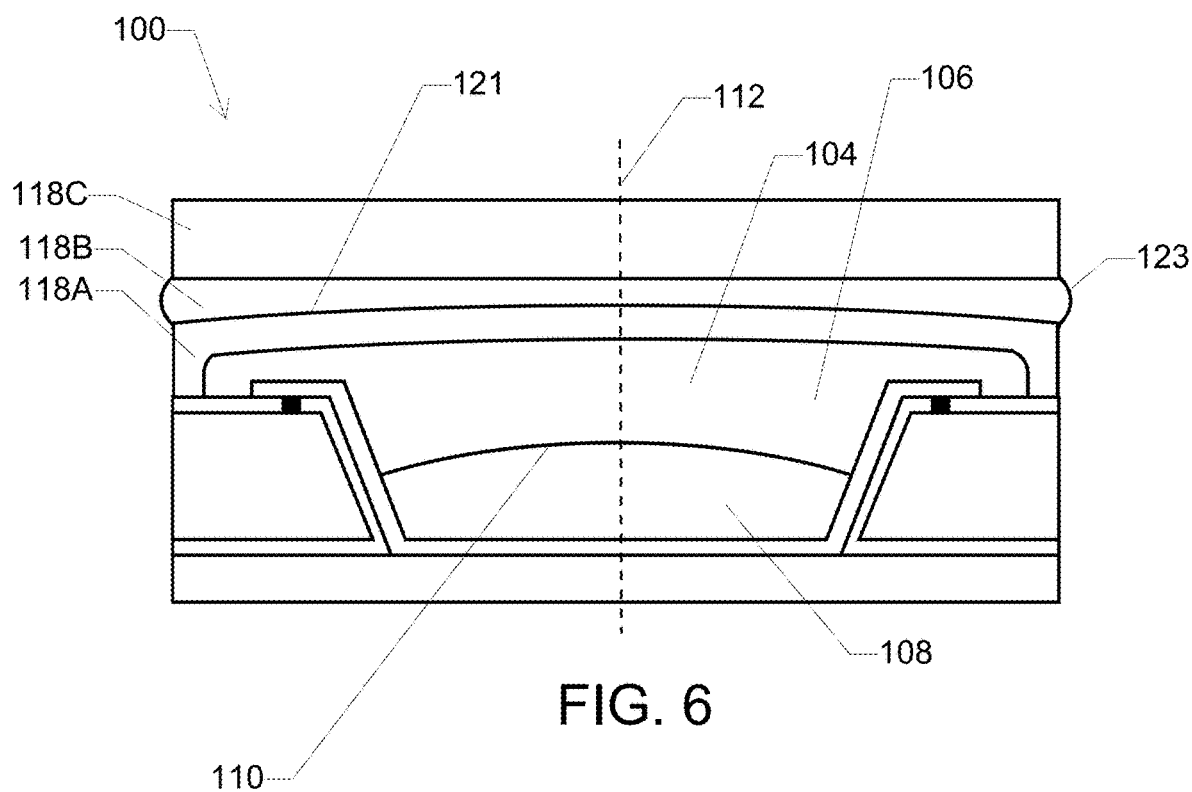
FIG. 6 is a schematic cross-sectional view of some embodiments of the liquid lens shown in FIG. 1 with a deflected interior ply compared to FIG. 1.

FIG. 6 is a schematic cross-sectional view of some embodiments of liquid lens 100 with interior ply 118A deflected compared to FIG. 1. Upon heating liquid lens 100 and/or expansion of first liquid 106 and/or second liquid 108, interior ply 118A can bow or deflect outward, thereby increasing the volume of cavity 104, which can accommodate the expansion of the liquids. For example, interior ply 118A can move or flex from a non-deflected configuration as shown in FIG. 1 to a deflected configuration as shown in FIG. 6. In the non-deflected configuration, interior ply 118A (e.g., the central region of the interior ply) can be substantially planar as shown in FIG. 1 or can have an initial radius of curvature. In the deflected configuration, interior ply 118A can have a smaller radius of curvature than in the non-deflected configuration as shown in FIG. 6. For example, interior ply 118A can be bowed or curved outward to a greater extent (e.g., bent to a smaller radius of curvature) in the deflected configuration than in the non-deflected configuration, which can increase the volume of cavity 104.

Such bowing or deflection of interior ply 118A can apply pressure to a central region of deformable spacer 118B. Deformable spacer 118B can be formed from a deformable material as described herein. In response to such applied pressure, the central region of deformable spacer 118B can be compressed. In some embodiments, deformable spacer 118B comprises one or more unconstrained outer edge portions 123. For example, unconstrained outer edge portions 123 comprise regions along a perimeter of deformable spacer 118B at which the material of the deformable spacer is free to move in a lateral direction (e.g., substantially perpendicular to structural axis 112). In response to the pressure applied to the central region of deformable spacer 118B, unconstrained edge portions 123 can bulge outward (e.g., in the lateral direction) as shown in FIG. 6.

In some embodiments, unconstrained edge portions 123 bulge outward beyond the outer perimeter of interior ply 118A and/or exterior ply 118C as shown in FIG. 6. In some embodiments, unconstrained edge portions bulge outward while remaining within the outer perimeter of interior ply 118A and/or exterior ply 118C. For example, in the non-deflected configuration, unconstrained edge portions 123 can be inset such that there is a lateral gap between the outer perimeter of deformable spacer 118B and the outer perimeter of interior ply 118A and/or exterior ply 118C. The lateral gap can be 1 mm, 0.9 mm, 0.8 mm, 0.7 mm, 0.6 mm, 0.5 mm, 0.4 mm, 0.3 mm, 0.2 mm, 0.1 mm, 0.05 mm, 0.04 mm, 0.03 mm, 0.02 mm, 0.01 mm, <0.01 mm, or any ranges defined by the listed values. Upon bulging of deformable spacer 118B, unconstrained edge portions 123 can expand into the lateral gap without bulging beyond the outer perimeter of interior ply 118A and/or exterior ply 118C. Such a configuration can enable liquid lens 100 to have a substantially constant footprint (e.g., substantially constant length, width, and/or perimeter) regardless of whether deformable spacer 123 is in the non-deflected configuration or the deflected configuration.

The shape of deformable spacer 118B can change to accommodate the bowing or deflection of interior ply 118A, thereby accommodating the expansion of first liquid 106 and/or second liquid 108. For example, deformable spacer 118B can change from a rest configuration shown in FIG. 1 to a stressed configuration shown in FIG. 6 (e.g., with unconstrained edge portions 123 of the deformable spacer squeezed or bulging from the edges of liquid lens 100). In the stressed configuration, a central thickness of deformable spacer 118B, measured along structural axis 112, can be less than an edge thickness of the deformable spacer, measured at an outer edge of liquid lens 100. For example, deformable spacer 118B can be deformed such that, in the stressed configuration, the distance between interior ply 118A (e.g., the exterior surface of the interior ply) and exterior ply 118C (e.g., the interior surface of the exterior ply) can be less at structural axis 112 (e.g., in the center of liquid lens 100) than at the outer edge of the liquid lens.

Such deformation of deformable spacer 118B can help to accommodate the bowing or deflection of interior ply 118A without substantially transferring the pressure applied by the interior ply to exterior ply 118C and/or without substantially changing the height or thickness of liquid lens 100 (e.g., in an axial direction parallel to structural axis 112). For example, exterior ply 118C can have the same or substantially the same radius of curvature regardless of whether interior ply 118A is in the non-deflected configuration or the deflected configuration and/or regardless of whether deformable spacer 118B is in the rest configuration or the stressed configuration. For example, exterior ply 118C can be in a substantially planar configuration before and after such bowing or deflection of interior ply 118A as shown in FIGS. 1 and 6. For example, with interior ply 118A in the non-deflected configuration, exterior ply 118C (e.g., a central region of the exterior ply) can be substantially planar as shown in FIG. 1 or can have an initial radius of curvature. With interior ply 118A in the deflected configuration, exterior ply 118A can have substantially the same radius of curvature as with the interior ply in the non-deflected configuration as shown in FIG. 6.

Although deflection of interior ply 118A is described with reference to FIGS. 1 and 6 as outward bowing in response to increasing temperature and/or expansion of first liquid 106 and/or second liquid 108, other embodiments are included in this disclosure. For example, upon cooling liquid lens 100 and/or contraction of first liquid 106 and/or second liquid 108, interior ply 118A can bow or deflect inward, thereby decreasing the volume of cavity 104, which can accommodate the contraction of the liquids. For example, interior ply 118A can be bowed or curved inward to a greater extent (e.g., bent to a smaller radius of curvature) in the deflected configuration than in the non-deflected configuration, which can decrease the volume of cavity 104. Such bowing or deflection of interior ply 118A can apply tension to the central region of deformable spacer 118B. In response to such applied tension, the central region of deformable spacer 118B can be expanded. In response to the tension applied to the central region of deformable spacer 118B, unconstrained edge portions 123 can retract inward (e.g., in the lateral direction). The shape of deformable spacer 118B can change to accommodate the bowing or deflection of interior ply 118A, thereby accommodating the contraction of first liquid 106 and/or second liquid 108. For example, in the stressed configuration, the central thickness of deformable spacer 118B, measured along structural axis 112, can be greater than the edge thickness of the deformable spacer, measured at the outer edge of liquid lens 100. For example, deformable spacer 118B can be deformed such that, in the stressed configuration, the distance between interior ply 118A and exterior ply 118C can be greater at structural axis 112 than at the outer edge of the liquid lens.

Deflection of interior ply 118A without a corresponding deflection of exterior ply 118C as described herein can help to prevent changing the focal length of liquid lens 100 as a function of temperature. For example, deflection of interior ply 118A can cause a corresponding deflection of index-matched boundary 121 as shown in FIGS. 1 and 6. However, because the refractive indices of interior ply 118A and deformable spacer 118B are substantially the same, the radius of curvature of index-matched boundary 121 can change without a corresponding change in optical power of the index-matched boundary. Such change in radius of curvature without a corresponding change in optical power can enable index-matched boundary 121 to deflect without changing the focal length or optical power of liquid lens 100. In some embodiments, the radius of curvature of each of the interior surface and the exterior surface of exterior ply 118C remains substantially constant as interior ply 118A and index-matched boundary 121 deflect. Such constant radius of curvature of exterior ply 118C can help to avoid any change in the focal length or optical power of liquid lens 100 resulting from changes in temperature. For example, because of any difference in refractive index between exterior ply 118C and deformable spacer 118B, any change in the radius of curvature of the interface between the interior surface of the exterior ply and the deformable spacer could result in a change in focal length or optical power of liquid lens 100. Additionally, or alternatively, because of any difference in refractive index between exterior ply 118C and the surrounding medium (e.g., air), any change in the radius of curvature of the interface between the exterior surface of the exterior ply and the surrounding medium could result in a change in focal length or optical power of liquid lens 100. The constant radius of curvature of exterior ply 118C can help to avoid such changes in focal length or optical power of liquid lens 100 that could otherwise accompany changes in temperature of the liquid lens.

In some embodiments, heating liquid lens 100 from a first temperature of 20° C. to a second temperature of 85° C. while maintaining variable interface 110 in a fixed position (e.g., a flat or zero diopter position) causes index-matched boundary 121 to deform without substantially changing a focal length or optical power of the liquid lens. For example, such heating changes the focal length or optical power of liquid lens 100 by 30 diopter, 25 diopter, 20 diopter, 15 diopter, 10 diopter, 5 diopter, 4 diopter, 3 diopter, 2 diopter, 1 diopter, 0.5 diopter, 0 diopter, or any ranges defined by the listed values. Additionally, or alternatively, such heating results in a change in curvature of interior ply 118A and substantially no change in curvature of exterior ply 118C. For example, following such heating, the radius of curvature of exterior ply 118C is at least 50% greater, at least 60% greater, at least 70% greater, at least 80% greater, at least 90% greater, at least 100% greater, 150% greater, 200% greater, 250% greater, 300% greater, 350% greater, 400% greater, 450% greater, 500% greater, 600% greater, 700% greater, 800% greater, 900% greater, 1000% greater, 1100% greater, 1200% greater, 1300% greater, 1400% greater, 1500% greater, or any ranges defined by the listed values greater than the radius of curvature of interior ply 118A.

In some embodiments, deformable spacer 118B is formed from a material that enables index-matched boundary 121 and/or the deformation described herein. For example, deformable spacer 118B comprises an elastomeric material such as silicone, thermoplastic elastomer (TPE), rubber (e.g., natural rubber, neoprene rubber, butyl rubber, or another rubber material), a combination thereof, or another suitable elastomeric and/or polymeric material. In some embodiments, deformable spacer 118B comprises a modulus of 0 MPa, 0.1 MPa, 0.2 MPa, 0.3 MPa, 0.4 MPa, 0.5 MPa, 0.6 MPa, 0.7 MPa, 0.8 MPa, 0.9 MPa, 1 MPa, 2 MPa, 3 MPa, 4 MPa, 5 MPa, 6 MPa, 7 MPa, 8 MPa, 9 MPa, 10 MPa, >10 MPa, or any ranges defined by the listed values. Additionally, or alternatively, deformable spacer comprises a hardness of 0 Shore OO, 10 Shore OO, 20 Shore OO, 30 Shore OO, 40 Shore OO, 50 Shore OO, 60 Shore OO, 70 Shore OO, 80 Shore OO, 90 Shore OO, 0 Shore A, 10 Shore A, 20 Shore A, 30 Shore A, 40 Shore A, 50 Shore A, or any ranges defined by the listed values.

In some embodiments, each of interior ply 118A and exterior ply 118C is formed from a glass, a ceramic, a glass-ceramic, a polymeric material, another suitable material, or a combination thereof. Interior ply 118A and exterior ply 118C can be formed from the same or different materials. In some embodiments, exterior ply 118C is thicker than interior ply 118A. For example, a ratio of a thickness of exterior ply 118C to a thickness of interior ply 118A is 1, 1.5, 2, 2.5, 3, or any ranges defined by the listed values. In some embodiments, exterior ply 118C is stiffer or more rigid than interior ply 118A. The difference in thickness and/or stiffness of exterior ply 118C and interior ply 118A can help to prevent the exterior ply from deflecting in response to deflection of the interior ply as described herein, which can help to prevent changes in focal length of liquid lens 100 with changes in temperature also as described herein.

Figure 7:
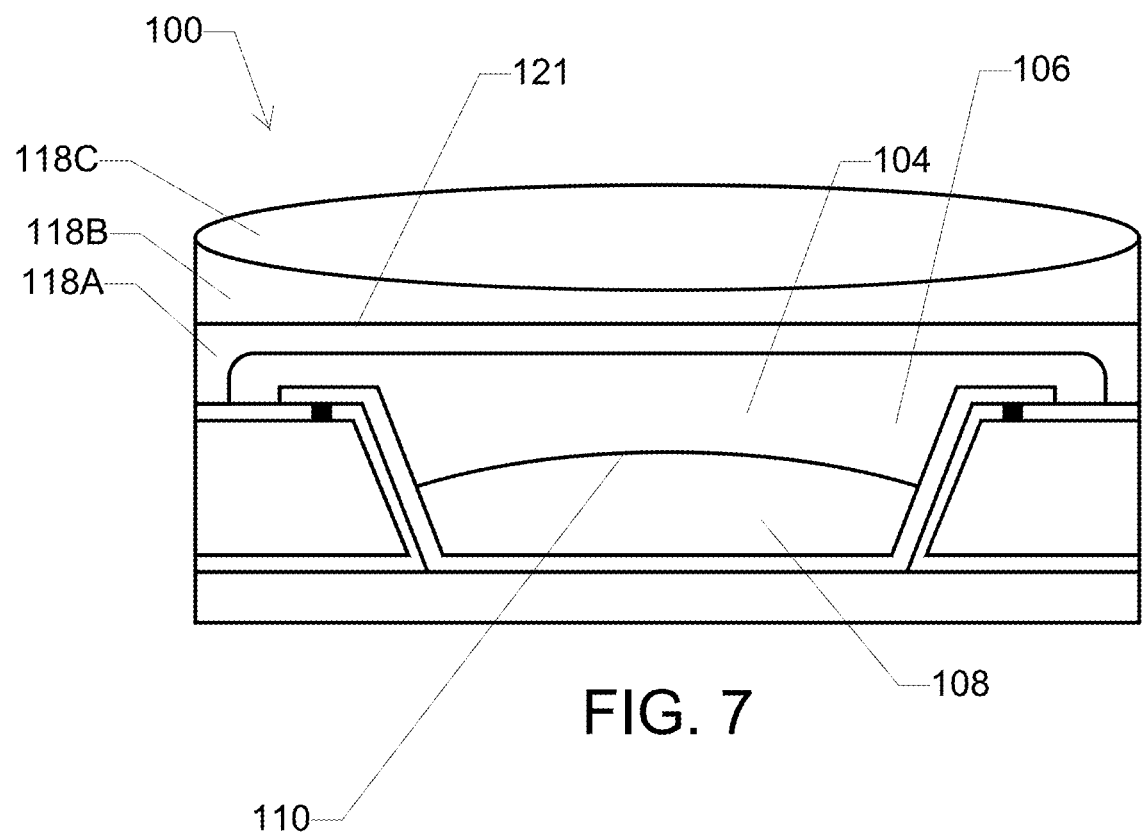
FIG. 7 is a schematic cross-sectional view of some embodiments of a liquid lens comprising an integrated fixed lens.

FIG. 7 is a schematic cross-sectional view of some embodiments of liquid lens 100. Liquid lens 100 shown in FIG. 7 is similar to the liquid lens shown in FIGS. 1-6 with the exception of the differences described below. In some embodiments, exterior ply 118C of first outer layer 118 comprises an integrated lens as opposed to a planar sheet or pane. For example, in the embodiments shown in FIG. 7, exterior ply 118C of first outer layer 118 comprises an integrated lens with a biconvex configuration. In some embodiments, at least one of the interior surface or the exterior surface of exterior ply 118C comprising the integrated lens is curved. For example, one of the interior surface or the exterior surface of the exterior ply can be curved, and the other of the interior surface or the exterior surface can be flat or planar. Alternatively, both of the interior surface and the exterior surface of the exterior ply can be curved. The curved surfaces can comprise simple or complex curved shapes. Exterior ply 118C can have a biconvex, plano-convex, positive meniscus, negative meniscus, plano-concave, biconcave, other suitable integrated lens configuration, or combination thereof. In some embodiments, exterior ply 118C can be one of the fixed lenses of a lens stack or optical system into which liquid lens 100 is integrated as described herein.

Figure 8:
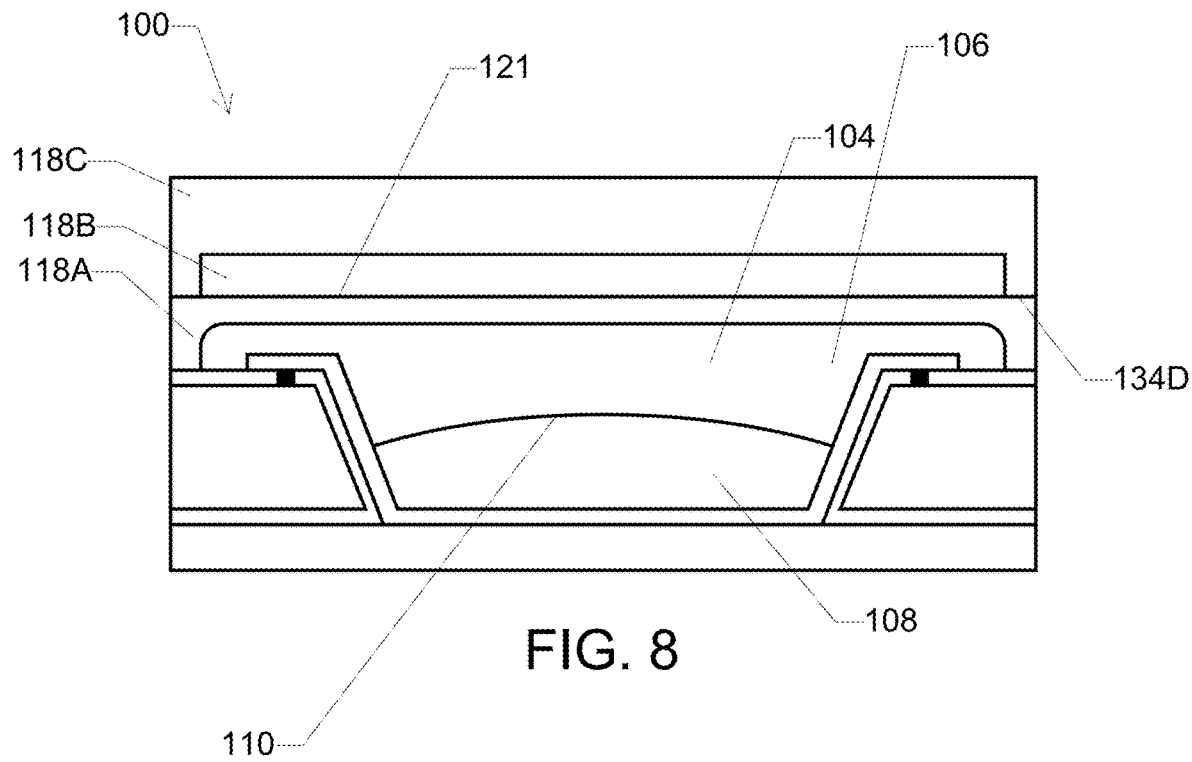
FIG. 8 is a schematic cross-sectional view of some embodiments of a liquid lens with an exterior ply bonded directly to an interior ply.

FIG. 8 is a schematic cross-sectional view of some embodiments of liquid lens 100. Liquid lens 100 shown in FIG. 8 is similar to the liquid lenses shown in FIGS. 1-7 with the exception of the differences described below. In some embodiments, exterior ply 118C of first outer layer 118 is bonded directly to interior ply 118A as opposed to or in addition to being bonded via deformable spacer 118B. For example, in the embodiments shown in FIG. 8, exterior ply 118C of first outer layer 118 is bonded to interior ply 118A at a bond 134D, which can be configured as described herein with respect to bond 134A. In some embodiments, exterior ply 118C comprises a central region and a peripheral region at least partially circumscribing the central region, and the peripheral region of the exterior ply can be bonded to interior ply 118A as shown in FIG. 8. Bonding exterior ply 118C directly to interior ply 118A can help to improve the structural stability of liquid lens 100 and/or prevent shifting of the exterior ply relative to the interior ply.

In some embodiments, exterior ply 118C comprises a notch formed therein (e.g., at the central region) such that the peripheral region of the exterior ply forms a flange that can be bonded to interior ply 118A. In some of such embodiments, the flange extends only partially around a perimeter of exterior ply 118C (e.g., only partially circumscribes the central region) such that deformable spacer 118B comprises an unconstrained edge portion that can bulge laterally outward upon deflection of interior layer 118A to accommodate for expansion of first liquid 106 and/or second liquid 108 as described herein. For example, the flange can extend along one edge, two edges, or three edges of the perimeter of exterior ply 118C, leaving at least one edge of deformable spacer 118B unconstrained. In some embodiments, unconstrained edge portions 123 of deformable spacer 118B are inset as described herein. In some of such embodiments, the gap is formed between unconstrained edge portions 123 of deformable spacer 118B and the flange of exterior ply 118C (e.g., with the deformable spacer in the unstressed configuration) such that the flange can extend along the entire or substantially the entire perimeter of exterior ply 118C without prohibiting the deformable spacer from deforming as described herein.

Although first outer layer 118 of liquid lenses 100 shown in FIGS. 1-8 is described as comprising the multi-layer structure, it will be understood that components of the first outer layer also comprise the multi-layer structure. For example, in the embodiments shown in FIGS. 1-8, first window 114 (e.g., the central region of first outer layer 118) and/or the peripheral region of the first outer layer can comprise the multi-layer structure.

Although first outer layer 118 of liquid lenses 100 shown in FIGS. 1-8 is described as comprising the multi-layer structure, other embodiments are included in this disclosure. For example, in some embodiments, the second outer layer of the liquid lens comprises the multi-layer structure or both the first outer layer and the second outer layer of the liquid lens comprise the multi-layer structure. In embodiments in which the second outer layer comprises the multi-layer structure, the interior ply can deform as described herein to avoid deformation of the exterior ply and a change in focal length of the liquid lens that would accompany such deformation of the exterior ply.

Figure 9:
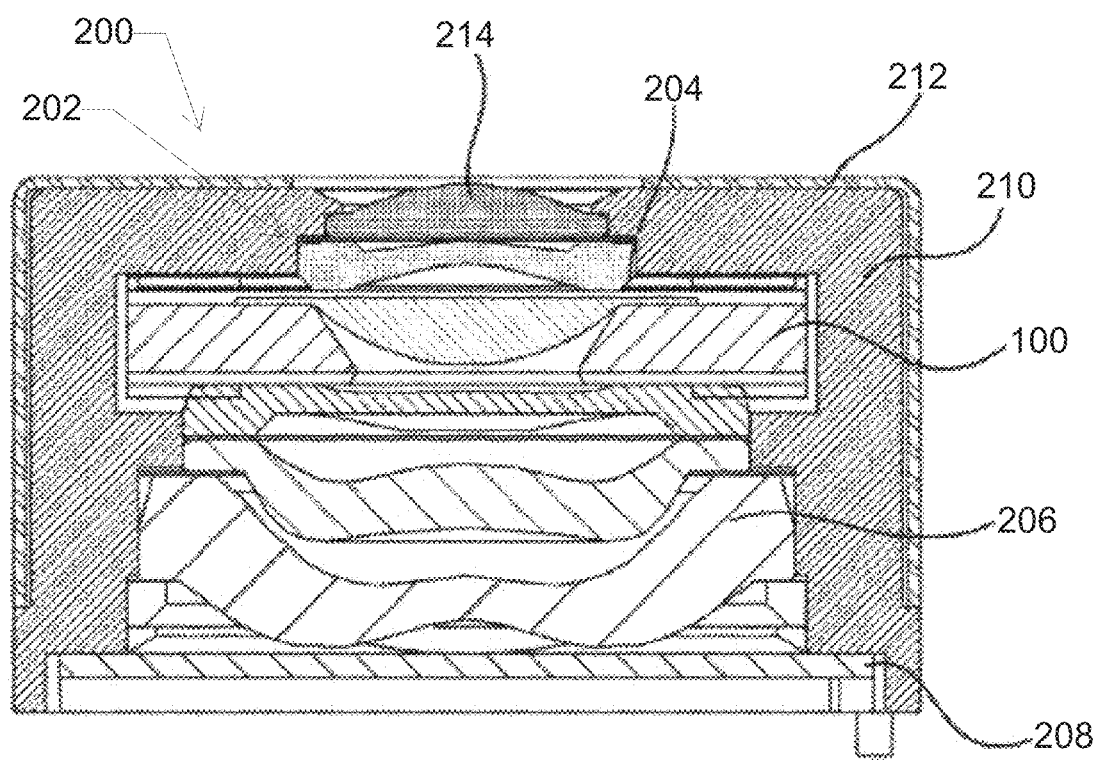
FIG. 9 is a schematic cross-sectional view of some embodiments of an image capture device comprising a liquid lens.

FIG. 9 is a schematic cross-sectional view of some embodiments of an image capture device 200. For example, image capture device 200 can be configured as a camera module operable to record images (e.g., still images and/or video). In some embodiments, image capture device 200 comprises a lens assembly 202. For example, lens assembly 202 comprises a first lens group 204, liquid lens 100, and a second lens group 206 aligned along an optical axis of the lens assembly. Each of first lens group 204 and second lens group 206 can comprise, independently, one or a plurality of lenses (e.g., fixed lenses).

Although lens assembly 202 is described herein as comprising liquid lens 100 disposed between first lens group 204 and second lens group 206, other embodiments are included in this disclosure. In some other embodiments, a lens assembly comprises a single lens or a single lens group disposed on either side (e.g., the object side or the image side) of liquid lens 100 along the optical axis.

In some embodiments, image capture device 200 comprises an image sensor 208. For example, lens assembly 202 is positioned to focus an image on image sensor 208. Image sensor 208 can comprise a semiconductor charge-coupled device (CCD), a complementary metal-oxide-semiconductor (CMOS), an N-type metal-oxide-semiconductor (NMOS), another image sensing device, or a combination thereof. Image sensor 208 can detect image light focused on the image sensor by lens assembly 202 to capture the image represented by the image light.

In some embodiments, image capture device 200 comprises a housing 210. For example, lens assembly 202 and/or image sensor 208 are mounted in housing 210 as shown in FIG. 9. Such a configuration can help to maintain proper alignment between lens assembly 202 and image sensor 208. In some embodiments, image capture device 200 comprises a cover 212. For example, cover 212 is positioned on housing 210. Cover 212 can help to protect and/or shield lens assembly 202, image sensor 208, and/or housing 210. In some embodiments, image capture device 200 comprises a lens cover 214 disposed adjacent lens assembly 202 (e.g., at the object side end of the lens assembly). Lens cover 214 can help to protect lens assembly 202 (e.g., first lens group 204) from scratches or other damage.

Figure 10:
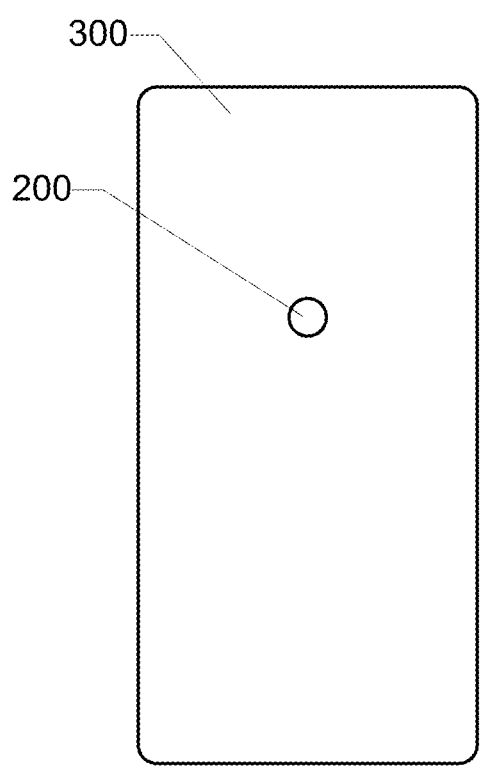
FIG. 10 is a schematic rear view of some embodiments of a smartphone comprising an image capture device.

In some embodiments, an electronic device comprises image capture device 200. For example, the electronic device can be a smartphone, a tablet computer, a laptop computer, a wearable device, an augmented reality (AR) device, a virtual reality (VR) device, a digital camera, a video chat device, an action camera device, or another suitable electronic device. FIG. 10 is a schematic rear view of some embodiments of a smartphone 300 comprising image capture device 200. In some embodiments, smartphone 300 can be operable to record a still image and/or a video using image capture device 200.

Although image capture device 200 is described as being incorporated into an electronic device, other embodiments are included in this disclosure. For example, in other embodiments, a vehicle (e.g., an automobile, a truck, a motorcycle, an aircraft, a bus, a train, a watercraft, a drone, or another type of conveyance for people or objects) comprises image capture device 200.

EXAMPLES

Various embodiments will be further clarified by the following examples.

Figure 11:
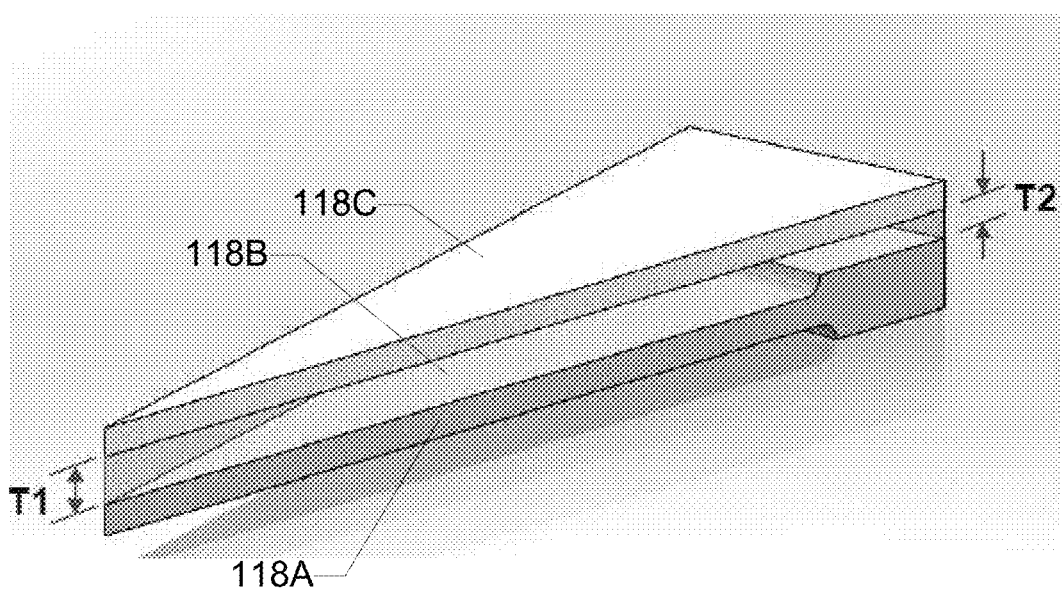
FIG. 11 is a perspective view of a pie-shaped segment of a first outer layer of some embodiments of a liquid lens comprising a multi-layer structure.

The behavior upon heating liquid lenses 100 having the general configuration shown in FIG. 1 is described using a series of examples. FIG. 11 is a perspective view of a pie-shaped segment of first outer layer 118 of liquid lenses 100 comprising the multi-layer structure. Interior ply 118A comprises a notch in the interior surface (e.g., as shown in FIG. 1) and also a corresponding notch in the exterior surface such that a cross-section of the interior ply comprises a dog-bone shape (e.g., with a thinner central region and a thicker peripheral region). The thickness of the central region of interior ply 118A (e.g., including first window 114) is 55 μm, and the thickness of the peripheral region of the interior ply is 120 μm. The diameter of the circular central region of interior ply 118A is 3.5 mm. The thickness of exterior ply 118C is uniform (e.g., the central region of the exterior ply has the same thickness as the peripheral region of the exterior ply) and is varied throughout the examples as explained below. Interior ply 118A and exterior ply 118C are laminated to each other via deformable spacer 118B such that the deformable spacer fills the gap between the interior ply and the exterior ply. Exterior ply 118C is not bonded directly to interior ply 118A such that unconstrained outer edge portion 123 extends around the entire perimeter of deformable spacer 118B. The thickness of the central region of deformable spacer 118B is T1, and the thickness of the peripheral region of the deformable spacer is T2. T2 is varied throughout the examples as explained below. T1 and T2 are related according to the following equation: T1=T2+32.5 μm. Each of interior ply 118A and exterior ply 118C is formed from a glass material commercially available from Schott North America as D263® T eco, which has a refractive index $n_D$ of 1.5230. Deformable spacer is formed from a silicone material commercially available from Dow as OE-6550, which has a refractive index of 1.54, a hardness of 55 Shore A, and a Young's modulus of 5.1 MPa.

Figure 12:
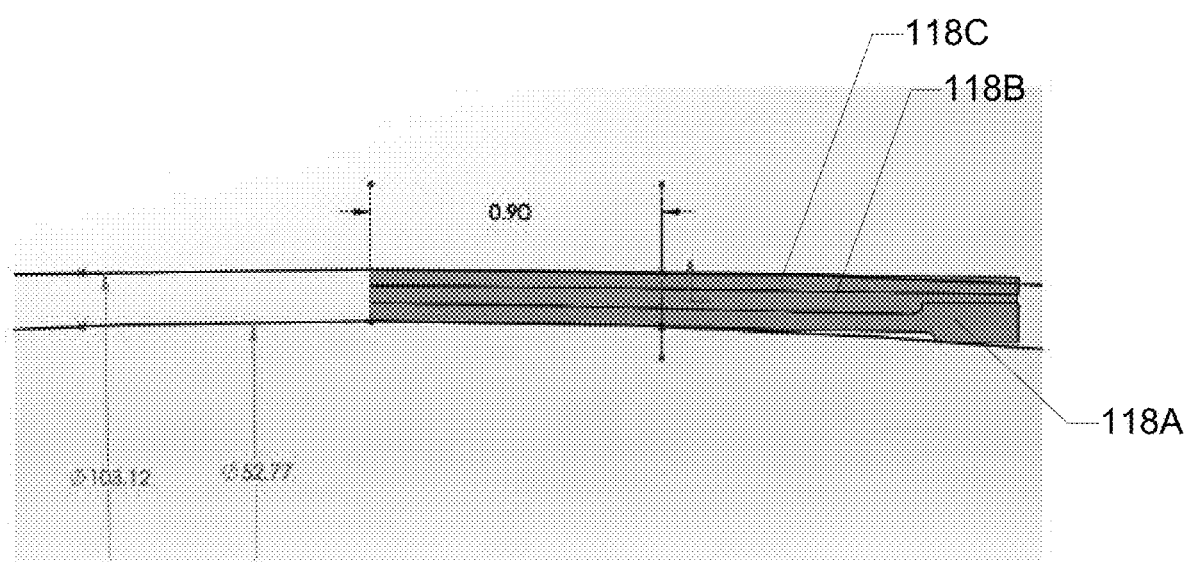
FIG. 12 is a cross-sectional schematic view of a first outer layer showing deflection of an interior ply and an exterior ply of a multi-layer structure upon heating a liquid lens as described in Example 1.

The thickness of exterior ply 118C and the thickness T2 of deformable spacer 118B are varied to determine the behavior of first outer layer 118 upon heating liquid lens 100 from a first temperature of 20° C. to a second temperature of 85° C., which exerts a pressure of 278 kPa on the interior surface of the central region of interior ply 118A. Prior to such heating, both interior ply 118A and exterior ply 118C are flat (e.g., with a radius of curvature approaching infinity). FIG. 12 is a cross-sectional schematic view of first outer layer 118 of Example 1 showing deflection of interior ply 118A and exterior ply 118C upon such heating for the multi-layer structure in which deformable spacer 118B has a thickness T2 of 30 μm and the exterior ply has a thickness of 50 μm. In Example 1, interior ply 118A deflects to a radius of curvature (ROC) of 26.4 mm, and exterior ply 118C deflects to a ROC of 51.6 mm, which is an increase of 95% compared to the ROC of the interior ply. Table 1 shows the configuration and ROC for seven liquid lenses with different exemplary multi-layer structures.

TABLE 1

ROC for Exemplary Multi-Layer Structures

| Example | T2 (μm) | Exterior Ply Thickness (μm) | Interior Ply ROC (mm) | Exterior Ply ROC (mm) | ROC Increase (%) |
| --- | --- | --- | --- | --- | --- |
| 1 | 30 | 50 | 26.4 | 51.6 | 95 |
| 2 | 50 | 50 | 25.0 | 49.0 | 96 |
| 3 | 70 | 50 | 23.9 | 73.6 | 208 |
| 4 | 90 | 50 | 23.3 | 110.8 | 376 |
| 5 | 110 | 50 | 22.9 | 163.0 | 612 |
| 6 | 150 | 50 | 22.5 | 319.2 | 1319 |
| 7 | 50 | 120 | 26.8 | 419.6 | 1465 |

Examples 1-7 demonstrate that deformable spacer 118B absorbs at least a portion of the deflection of interior layer 118A, such that exterior layer 118C experiences a reduced deflection (demonstrated by an increased ROC) compared to the interior layer upon heating liquid lens 100.

As shown in Examples 1-6, increasing the thickness T2 of deformable spacer 118B without changing the thickness of exterior ply 118C generally (a) reduces the ROC of interior ply 118A, indicating that the interior ply experiences a greater deflection or bends to a smaller radius of curvature, (b) increases the ROC of the exterior ply, indicating that the exterior ply experiences a lesser deflection or bends to a larger radius of curvature, and (c) increases the increase in ROC of the exterior ply compared to the ROC of the interior ply. Thus, comparing Examples 1-6 suggests that increasing the thickness T2 of deformable spacer 118B can reduce the effect of temperature on the focal length or optical power of liquid lens 100 for a given thickness of exterior ply 118C. For example, increasing the thickness T2 of deformable spacer 118B can enable interior ply 118A to bow outward to a greater extent to accommodate expansion of first liquid 106 and/or second liquid 108 without transferring such bowing to exterior ply 118C.

As shown in Examples 2 and 7, increasing the thickness of exterior ply 118C without changing the thickness of deformable spacer 118B generally (a) increases the ROC of the exterior ply, indicating that the exterior ply experiences a lesser deflection or bends to a larger radius of curvature, and (b) increases the increase in ROC of the exterior ply compared to the ROC of interior ply 118A. Thus, comparing Examples 2 and 7 suggests that increasing the thickness of exterior ply 118C can reduce the effect of temperature on the focal length or optical power of liquid lens 100 for a given thickness of deformable spacer 118B.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A liquid lens comprising:
a cavity disposed between a first window and a second window;
a first liquid disposed in the cavity;
a second liquid disposed in the cavity; and
a variable interface disposed between the first liquid and the second liquid, thereby forming a variable lens;
wherein at least one of the first window or the second window comprises a multi-layer structure comprising an interior ply, an exterior ply, and a deformable spacer disposed between the interior ply and the exterior ply;
wherein a refractive index of the interior ply is substantially the same as a refractive index of the deformable spacer, whereby an index-matched boundary is formed between the interior ply and the deformable spacer; and
wherein a structural axis of the liquid lens passes through each of the index-matched boundary and the variable interface.

2. The liquid lens of claim 1, wherein the exterior ply is more rigid than the interior ply.

3. The liquid lens of claim 1, wherein heating the liquid lens from a first temperature of 20° C. to a second temperature of 85° C. while maintaining the variable interface in a fixed position causes the index-matched boundary to deform without substantially changing a focal length of the liquid lens.

4. The liquid lens of claim 1, wherein heating the liquid lens from a first temperature of 20° C. to a second temperature of 85° C. while maintaining the variable interface in a fixed position results in substantially no change in a focal length of the liquid lens.

5. The liquid lens of claim 1, wherein heating the liquid lens from a first temperature of 20° C. to a second temperature of 85° C. while maintaining the variable interface in a fixed position results in a change in radius of curvature of the interior ply and substantially no change in curvature of the exterior ply.

6. The liquid lens of claim 1, wherein:
the deformable spacer comprises an unconstrained edge portion; and
heating the liquid lens from a first temperature of 20° C. to a second temperature of 85° C. results in a change in curvature of the interior ply and a bulging of the unconstrained edge portion of the deformable spacer.

7. The liquid lens of claim 1, wherein:
the interior ply of the multi-layer structure comprises a glass material; and
the interior ply and the exterior ply are bonded to each other via the deformable spacer.

8. The liquid lens of claim 7, wherein the exterior ply of the multi-layer structure comprises a glass material.

9. The liquid lens of claim 7, wherein the exterior ply of the multi-layer structure comprises a polymeric material.

10. The liquid lens of claim 1, wherein the exterior ply of the multi-layer structure comprises a substantially planar sheet.

11. The liquid lens of claim 1, wherein the exterior ply of the multi-layer structure comprises a lens.

12. The liquid lens of claim 1, comprising:
a first outer layer comprising the first window and a peripheral portion substantially circumscribing the first window; and
an intermediate layer comprising a bore formed therein to define at least a portion of the cavity;
wherein the peripheral portion of the first outer layer is bonded to the intermediate layer.

13. The liquid lens of claim 12, comprising:
a second outer layer comprising the second window and a peripheral portion substantially circumscribing the second window;
wherein the peripheral portion of the second outer layer is bonded to the intermediate layer opposite the first outer layer.

14. The liquid lens of claim 12, wherein the intermediate layer comprises the second window.

15. The liquid lens of claim 1, wherein an inner surface of the interior ply is disposed within the cavity and in contact with at least one of the first liquid or the second liquid.

16. A liquid lens comprising:
a cavity disposed between a first window and a second window;
a first liquid disposed in the cavity;
a second liquid disposed in the cavity; and
a variable interface disposed between the first liquid and the second liquid, thereby forming a variable lens;
wherein at least one of the first window or the second window comprises a multi-layer structure comprising an interior ply, an exterior ply, and a deformable spacer disposed between the interior ply and the exterior ply; and
wherein heating the liquid lens from a first temperature of 20° C. to a second temperature of 85° C. while maintaining the variable interface in a fixed position causes an index-matched boundary between the interior ply and the deformable spacer to deform without substantially changing a focal length of the liquid lens.

17. A liquid lens comprising:
a cavity disposed between a first window and a second window;
a first liquid disposed in the cavity;
a second liquid disposed in the cavity; and
a variable interface disposed between the first liquid and the second liquid, thereby forming a variable lens;
wherein at least one of the first window or the second window comprises a multi-layer structure comprising an interior ply laminated to an exterior ply via a deformable spacer;
wherein the deformable spacer comprises an elastomeric material; and
wherein heating the liquid lens from a first temperature of 20° C. to a second temperature of 85° C. causes a boundary between the interior ply and the deformable spacer to deform and an unconstrained edge portion of the deformable spacer to bulge outward.

18. The liquid lens of claim 17, wherein a refractive index of the interior ply is substantially the same as a refractive index of the deformable spacer, whereby the boundary between the interior ply and the deformable spacer comprises an index-matched boundary.

\* \* \* \* \*